United States Patent [19]
Kurdi et al.

[11] Patent Number: 5,166,989
[45] Date of Patent: Nov. 24, 1992

[54] INTEGRATED POLARIZATION DETECTION SYSTEM

[75] Inventors: Bulent N. Kurdi; Glenn T. Sincerbox; James M. Zavislan, all of San Jose, Calif.

[73] Assignee: International Business Machines Corporation, Armonk, N.Y.

[21] Appl. No.: 614,332

[22] Filed: Nov. 16, 1990

[51] Int. Cl.$^5$ .............................................. G11B 7/135
[52] U.S. Cl. ........................................ 385/11; 385/14; 369/44.12; 369/110
[58] Field of Search ............... 369/44.12, 44.11, 44.37, 369/44.41, 44.42, 44.25, 109, 110, 116, 118, 112; 359/563, 566, 568, 569, 484, 130; 385/11, 6, 12, 37, 14, 129

[56] References Cited

U.S. PATENT DOCUMENTS

| | | | |
|---|---|---|---|
| 4,672,187 | 6/1987 | Fujita et al. | 250/201 |
| 4,718,052 | 1/1988 | Kondo et al. | 369/44 |
| 4,720,824 | 1/1988 | Hayashi | 385/14 |
| 4,858,218 | 8/1988 | Takagi et al. | 369/109 |
| 4,861,128 | 8/1989 | Ishikawa et al. | 350/96.13 |
| 4,868,803 | 9/1989 | Sunagawa et al. | 369/44 |
| 4,885,732 | 12/1989 | Sunagawa et al. | 369/44 |
| 4,939,682 | 7/1990 | Falk | 385/14 |
| 4,993,035 | 2/1991 | Laikhtman | 385/14 |
| 5,051,974 | 9/1991 | Taniguchi et al. | 369/44.12 |
| 5,060,212 | 10/1991 | Fujita et al. | 369/44.12 |
| 5,066,138 | 11/1991 | Toide et al. | 369/44.12 |

OTHER PUBLICATIONS

Shogo Ura et al., "*Focusing Grating Couplers For Polarization Detection*", vol. 6, No. 6, Jun. 1988.

H. Sunagawa et al., "*An Integrated Optic Detection Device For Magneto-Optical Disk Pick-Up*", International Symposium on Optical Memory 1987, Sep. 16–18, 1987, Tokyo Japan.

*Primary Examiner*—Aristotelis Psitos
*Assistant Examiner*—Muhammad Edun
*Attorney, Agent, or Firm*—Douglas R. Millett

[57] ABSTRACT

A substrate has a pair of overlapping optical couplers for separately coupling a first and a second polarization component of a light beam into a first and a second waveguide channel. The channels are oriented with their longitudinal axis approximately perpendicular to each other. A first and a second optical detector are located in the first and second waveguide channels, respectively, for measuring the light intensity of the first and second polarization components.

24 Claims, 5 Drawing Sheets

INTEGRATED POLARIZATION DETECTION SYSTEM

BACKGROUND OF THE INVENTION

1. Field of the Invention

This invention relates to polarization detectors and more particularly to polarization detectors for use in optical recording systems.

2. Description of the Prior Art

Polarized light is used in a number of applications such as thin film depth measurement and magneto-optic recording. In such systems it is necessary to be able to determine the state of polarization, i.e. direction of the plane of polarization.

Magneto-optic recording systems allow erasable storage of data. A laser beam is focused onto a spot on a magneto-optic disk medium and heats the material to a temperature at which the magnetic domain of the medium may be changed. A magnetic field is then applied in one of two directions and orients the magnetic domain of the spot in either an upward or downward direction.

The disk is read by focusing a low-power polarized laser beam onto the spot on the disk. The Kerr effect causes the reflected beam's plane of polarization to be rotated either clockwise or counterclockwise depending upon the direction of the magnetic domain of the recorded spot. The difference in the rotation is detected and represents the digital data. The disk can be rerecorded by heating the spots and switching the directions of the magnetic domains.

The detection of the direction of polarization is critical to these optical recording systems. Some of these systems use discrete optical components, such as Wollaston prisms, to separate the reflected light beam into two orthogonal polarization component beams. The intensity of these beams is then detected and compared. The exact direction of the plane of polarization of the original reflected beam can then be determined.

Another way to separate the orthogonal polarization components is to use optical grating couplers. Examples include U.S. Pat. No. 4,868,803 issued Sep. 19, 1989 to Sunagawa et al.; "Focusing Grating Couplers for Polarization Detection" by Shogo Ura et al., *Journal of Lightwave Technology*, Vol. 6, No. 6, June 1988; and "An Integrated Optic Detection Device for Magneto-optical Disk Pickup", by Sunagawa et al., International Symposium On Optical Memory 1987, September 16–18, 1987, Tokyo, Japan. These references show a combination of Transverse Electric (TE) and Transverse Magnetic (TM) grating couplers positioned side by side in the beam path of light returning from a magneto-optic disk. The TE and TM gratings each couple a different orthogonal polarization component into a waveguide. A problem with this approach is that only portions of the beam are being sampled for each polarization component. The beam is often nonuniform in its intensity, and errors in detection can occur.

What is needed is an integral polarization detection system with improved sensitivity and reliability.

SUMMARY OF THE INVENTION

Briefly, in a preferred embodiment, the present invention includes a pair of overlapping optical couplers for separately coupling a first and a second polarization component of a light beam into a first and a second waveguide channel. The channels are oriented with their longitudinal axes approximately perpendicular to each other. A first and a second optical detector are located in the first and second waveguide channels, respectively, for measuring the light intensity of the first and second polarization components.

For a fuller understanding of the nature and advantages of the present invention, reference should be made to the following detailed description taken in conjunction with the accompanying drawings.

DESCRIPTION OF THE PREFERRED EMBODIMENTS

Figure 1:
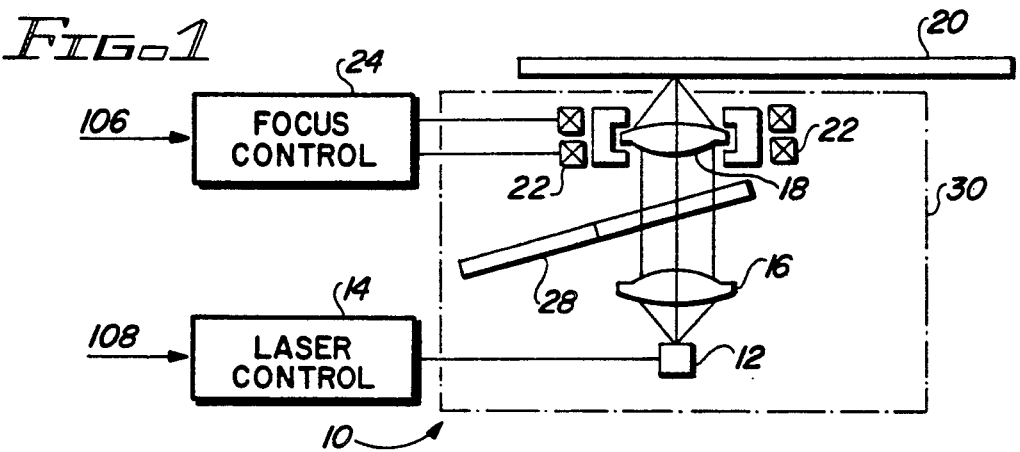
FIG. 1 is a schematic diagram of an optical data storage system of the present invention.

FIG. 1 shows a data recording system of the present invention which is designated by the general reference number 10. System 10 includes a laser 12 for providing a beam of polarized light. Laser 12 is preferably a laser diode such as a semiconductor diode laser although other types of light sources may also be used. A laser control circuit 14 is connected to laser 12. Circuit 14 is a power control circuit as is known in the art. A collimating lens 16 collimates the light from laser 12 and a focusing lens 18 focuses the collimated light on to an optical recording medium 20. Medium 20 is made of a magneto-optic material in the preferred embodiment. Lens 18 is attached to a focus motor 22 which in turn is connected to a focus control circuit 24. Circuit 24 controls movement of motor 22 and is well known in the art. An opto-electronic channel 28 is located between lens 16 and lens 18. Laser 12, lenses 16 and 18, opto-electronic channel 28 and motor 22 comprise an optical head 30.

Figure 2:
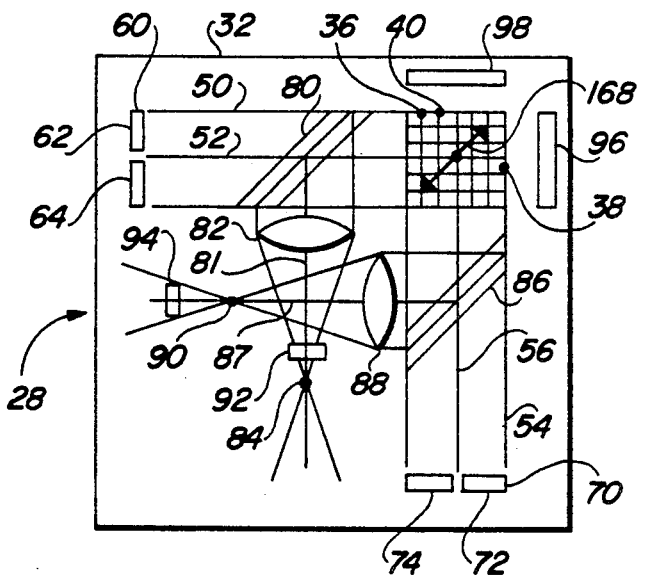
FIG. 2 is a schematic diagram of the opto-electronic channel portion of the system of FIG. 1.

FIG. 2 shows a detailed view of the opto-electronic channel 28. Channel 28 has a glass substrate 32. Substrate 32 has a crossed grating 36 comprised of a pair of polarization grating couplers 38 and 40. Couplers 38 and 40 are aligned approximately perpendicular to each other. Coupler 38 is oriented to couple light of a first orthogonal polarization component into a waveguide 50 along an axis 52. Coupler 40 is oriented to couple light of a second orthogonal polarization component into a waveguide 54 along an axis 56. Axes 52 and 56 are both located in a plane parallel to the plane of substrate 32. Couplers 38 and 40 are both preferably transverse electric (TE) type grating couplers although they could alternatively both be transverse magnetic (TM) type grating couplers. Couplers 38 and 40 are Bragg matched to the lowest order TE mode of their respective waveguide 50 and 54. Alternatively, if couplers 38 and 40 are of the TM type they would be Bragg matched to the lowest order TM mode of waveguides 50 and 54, respectively.

Waveguides 50 and 54 are preferably single-mode planar-type waveguides formed on substrate 32 and extending over the entire top surface of substrate 32. The boundaries of waveguides 50 and 54 are determined by the couplers 38 and 40. The axes 52 and 56 are oriented approximately perpendicular to each other. An optical detector 60 is located within or on waveguide 50. Detector 60 is comprised of a pair of two separate sections 62 and 64. An optical detector 70 is located within or on waveguide 54. Detector 70 is comprised of a pair of separate sections 72 and 74.

A beamsplitter 80 is located within or on waveguide 50 between the grating 38 and the detector 60. Beamsplitter 80 directs a portion of the light in waveguide 50 along an axis 81 to a lens 82 which focuses the light at focus point 84. A beam splitter 86 is located within or on waveguide 54 between the grating 40 and the detector 70. Beamsplitter 86 directs a portion of the light in waveguide 54 along an axis 87 to a lens 88 which focuses the light at a focus point 90. Lenses 82 and 88 are formed within or on waveguide, 50 and 54, respectively. Alternatively, beamsplitters 80 and 86 and lenses 82 and 88 may be formed within or on substrate 32.

An optical detector 92 is located along axis 81 a distance in front of focus point 84. An optical detector 94 is located along axis 87 behind focus point 90. When medium 20 (FIG. 1) is in focus the distance between detector 92 and point 84 will approximately equal the distance between detector 94 and point 90. The detectors 92 and 94 are smaller than the beam diameter at that point. When medium 20 is in focus, light spills over the edge of the detectors 92 and 94. An optical detector 96 is located on substrate 32 along axis 52 on the opposite side of grating 38 from waveguide 50. An optical detector 98 is located on substrate 32 along axis 56 on the opposite side of grating 40 from waveguide 54.

Figure 3:
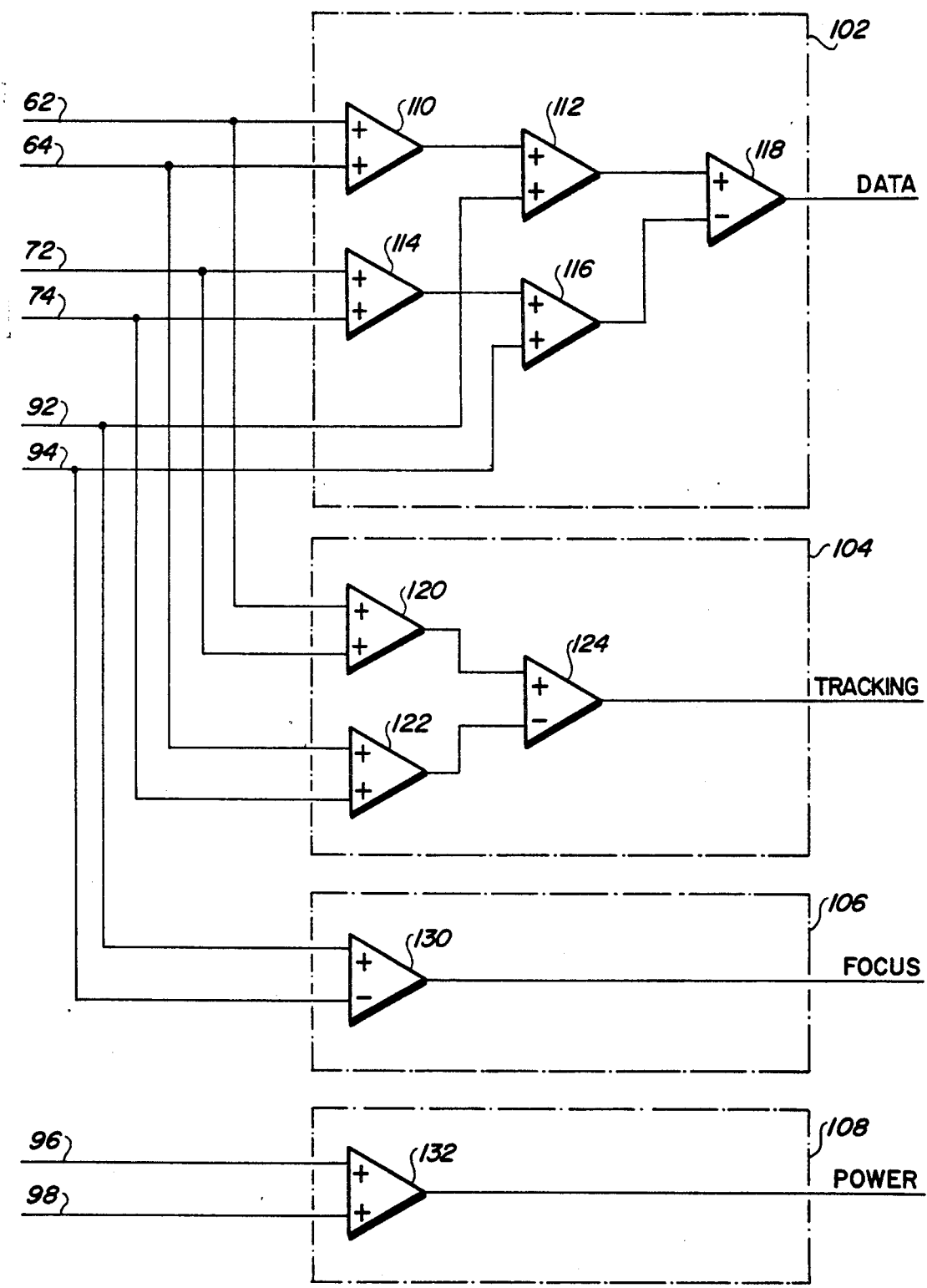
FIG. 3 is a diagram of a circuit for the system of FIG. 2.

FIG. 3 shows a diagram of a detector circuit and is designated by the general reference number 100. Circuit 100 is comprised of a data detector circuit 102, a track detector circuit 104, a focus detector circuit 106 and a power detector circuit 108. Circuit 102 has a summing amplifier 110 which is connected to detectors 62 and 64. The output from amplifier 110 and the output from detector 92 are connected to a summing amplifier 112. A summing amplifier 114 is connected to detectors 72 and 74. The output from amplifier 114 and the output from detector 94 are connected to a summing amplifier 116. The outputs from amplifiers 112 and 116 are connected to a differential amplifier 118. The output of amplifier 118 is the data signal.

Circuit 104 has a summing amplifier 120 which is connected to detectors 62 and 72. A summing amplifier 122 is connected to detectors 64 and 74. The outputs of amplifiers 120 and 122 are connected to a differential amplifier 124. The output of amplifier 124 is the track error signal.

Circuit 106 has a differential amplifier 130 which is connected to the outputs of detectors 92 and 94. The output of amplifier 130 is the focus error signal.

Circuit 108 has a summing amplifier 132 which is connected to detectors 96 and 98. The output of amplifier 132 is the power signal.

Figure 4:
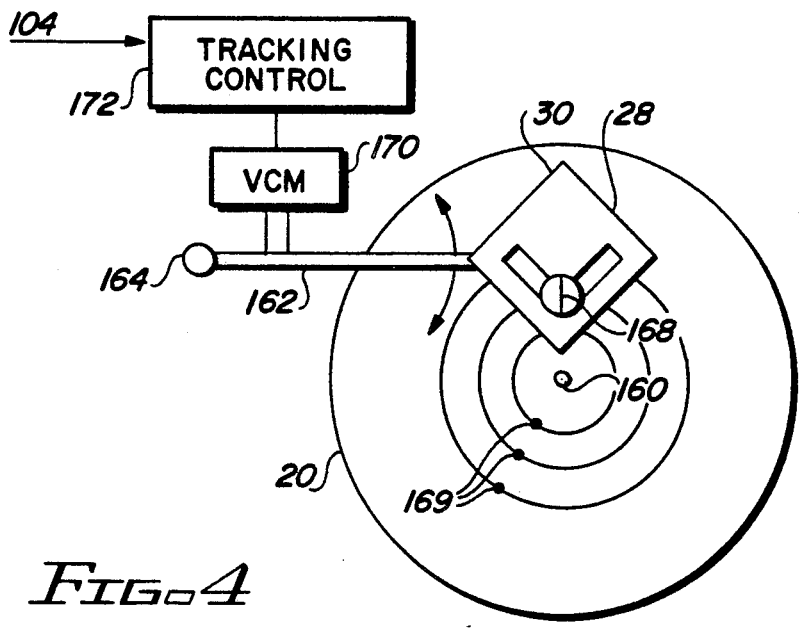
FIG. 4 is a schematic diagram of a portion of the system of FIG. 1 as used in a rotary actuator system.

FIG. 4 shows system 10 as used in a rotary actuator. Disk medium 20 is mounted on a disk drive spindle 160. A rotary actuator arm 162 is mounted about a pivot point 164. Arm 162 is positioned underneath disk 20. The optical head 30 is attached to the end of arm 162. In this case only the opto-electronic channel 28 of head 30 is shown. Note that a plane of polarization 168 of the incoming light from laser 12 is approximately perpendicular to the concentric tracks 169 of disk 20. The channel 28 is illustrated in an enlarged view in order to show its orientation with respect to the disk 20.

A voice coil motor 170 is attached to arm 162. A tracking control circuit 172 is connected to motor 170. Circuit 172 controls the movement of motor 170 and is well known in the art.

The operation of system 10 may now be understood. Incoming polarized light from laser 12 is collimated by lens 16 and passes through coupler 36 of opto-electronic channel 28. The laser 12 is oriented so that the plane of polarization 168 of the incoming light is offset at an equal angle from both the axis 52 and 56.

A portion of the incoming light is diverted by couplers 3 and 40 to the optical detectors 96 and 98, respectively. Coupler 38 diverts a first orthogonal component of the incoming light and coupler 40 diverts a second orthogonal component of the incoming light. Since the plane of polarization 168 is offset at equal angles to each coupler 38 and 40, the intensities of the first and second orthogonal components which hit detectors 96 and 98 are approximately equal. The outputs of detectors 96 and 98 are added by summing amplifier 132 and a power signal is generated. This power signal is then transmitted to laser control circuit 14 which adjusts the laser 12 to the proper power level.

The incoming light which is not coupled to detectors 96 and 98 continues through coupler 36 and is focused by lens 18 onto disk 20. When the incoming light reflects from the recorded data spots on the disk 20 its plane of polarization is rotated either clockwise or counter clockwise depending upon whether a one or a zero is recorded. This reflected light then returns through lens 18 to couplers 38 and 40. Coupler 38 diverts a first orthogonal component of the reflected light along axis 52 and into waveguide 50. Coupler 40 diverts a second orthogonal component of the reflected light along axis 56 and into waveguide 54. Couplers 38 and 40 are able to distinguish between the incoming and reflected light because channel 28 is positioned at a slight angle (1°-3°, for example) relative to the plane perpendicular to the direction of propagation of the light. Thus, in order to ensure that the light will be coupled in the proper directions, axes 52 and 56 should represent the projections of the orthogonal polarization components of the incident light on the channel 28. The angles at which axes 52 and 56 are offset from the plane perpendicular to the direction of light polarization are equal.

The first polarization component light travels along waveguide 50 to beamsplitter 80. A portion of the light is diverted to lens 82 and then to detector 92. The remaining light continues along waveguide 50 to detectors 62 and 64. The second orthogonal polarization component of the light travels along waveguide 54 to beamsplitter 86. A portion of the light is diverted to lens 88 and detector 94. The remaining light continues along waveguide 54 to detectors 72 and 74.

As stated above, the recorded spots on the disk 20 will cause the plane of polarization of the reflected light to be rotated either clockwise or counter clockwise relative to the plane of polarization 168 of the incoming light. This rotation will cause the first polarization component of light in waveguide 50 to have a greater intensity than the second polarization component in waveguide 54 or vice versa. The intensity of the first component is determined by summing the outputs of detectors 62, 64 and 92 in circuit 102. The intensity of the second component is determined by summing the outputs of detectors 72, 74 and 94 in circuit 102. The difference between the two is then determined and this represents the data signal.

When the incoming light is focused directly on a track of disk 20, the reflected light will be symmetrically distributed across couplers 38 and 40. Detectors 62 and 72 will receive the same amount of light as detectors 64 and 74. If the incoming light drifts off track then the sum of the outputs of detectors 62 and 72 will be greater than the sum of detectors 64 and 74 or vice versa. Circuit 104 determines this difference and sends a track error signal to the tracking control circuit 172 which in turn operates motor 170 to adjust the arm and keep the light on track.

When the incoming light is perfectly focused by lens 18 on to disk 20, the reflected light will return to channel 28 as parallel beams of light. The light passing through lens 82 will converge at focal point 84 and the light passing through lens 88 will converge at focal point 90. Detectors 92 and 94 are positioned on opposite sides of points 84 and 90, respectively, and the distances between points 84 and 90 and detectors 92 and 94, respectively, are approximately the same. The outputs of the detectors 92 and 94 will be the same when the lens 18 is focused on disk 20. The detectors 92 and 94 are positioned relative to points 84 and 90 so the detectors are slightly overfilled with light when the medium 20 is in focus. If the incoming light is not correctly focussed by lens 18, then the reflected light will not be parallel but will be slightly converging or diverging. This causes the focal points 84 and 90 to be shifted either forward or backward relative to lenses 82 and 88. The amount of light falling on one of detectors 92 or 94 will increase while the light falling on the other will decrease. This difference is detected by circuit 106 which transmits a focus error signal to the focus control circuit 24. Circuit 24 causes motor 22 to move lens 18 up or down relative to disk 20 to return the light to the proper focus.

Other embodiments of the present invention are possible. For example, instead of making the optical channel all on one side of substrate 32, parts can be made on separate sides. The coupler 38, waveguide 50 and related parts can be made on a first side of substrate 32 and coupler 40, waveguide 54 and related parts can be made on the second side. Coupler 38 is then directly above coupler 40. The top view of the assembly will look exactly like the channel 28 of FIG. 2.

Figure 5:
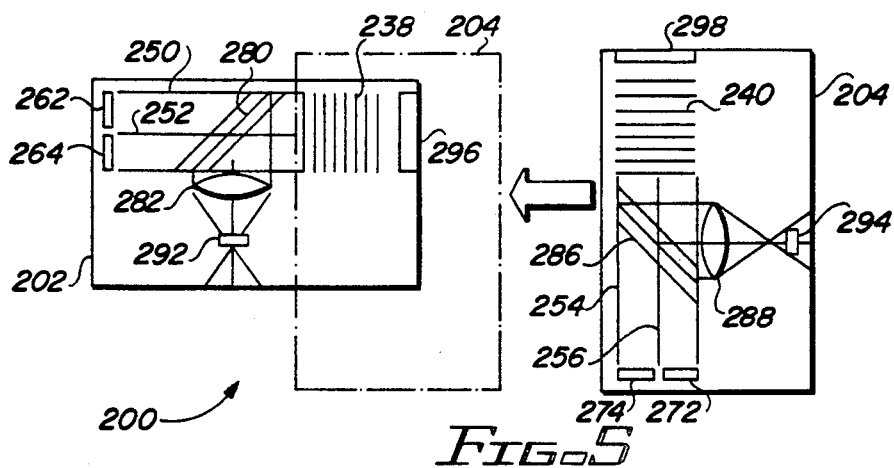
FIG. 5 is a schematic diagram of an alternative embodiment of the opto-electronic channel of the present invention.

FIG. 5 shows a further embodiment of the optical channel of the present invention which is designated by the general reference number 200. Optical channel 200 may be used in place of channel 28 of system 10. Channel 200 is comprised of a pair of substrates 202 and 204. Substrate 202 has a coupler 238, a waveguide 250, an axis 252, and a pair of detectors 262, 264 which are similar to coupler 38, waveguide 50, axis 52, and detectors 62, 64, respectively, of channel 28. Substrate 202 also has a beamsplitter 280, a lens 282, a detector 292 and 296 which are similar to beamsplitter 80, lens 82, and detectors 92 and 96, respectively, of channel 28.

Substrate 204 has a coupler 240, a waveguide 254, an axis 256 and a pair of detectors 272 and 274 which are similar to coupler 40, waveguide 54, axis 56, and detectors 72 and 74, respectively, of channel 28. Substrate 204 also has a beamsplitter 286, a lens 288, and detectors 294 and 298 which are similar to beamsplitter 86, lens 88, and detectors 94 and 98, respectively, of channel 28.

Substrate 202 is positioned either above or below substrate 204 such that coupler 238 is either above or below coupler 240. In effect the couplers 238 and 240 overlap. The substrates are adjusted so that the axes 252 and 256 are approximately perpendicular to one another. The operation of channel 200 is otherwise similar to that described in connection with channel 28.

Figure 6:
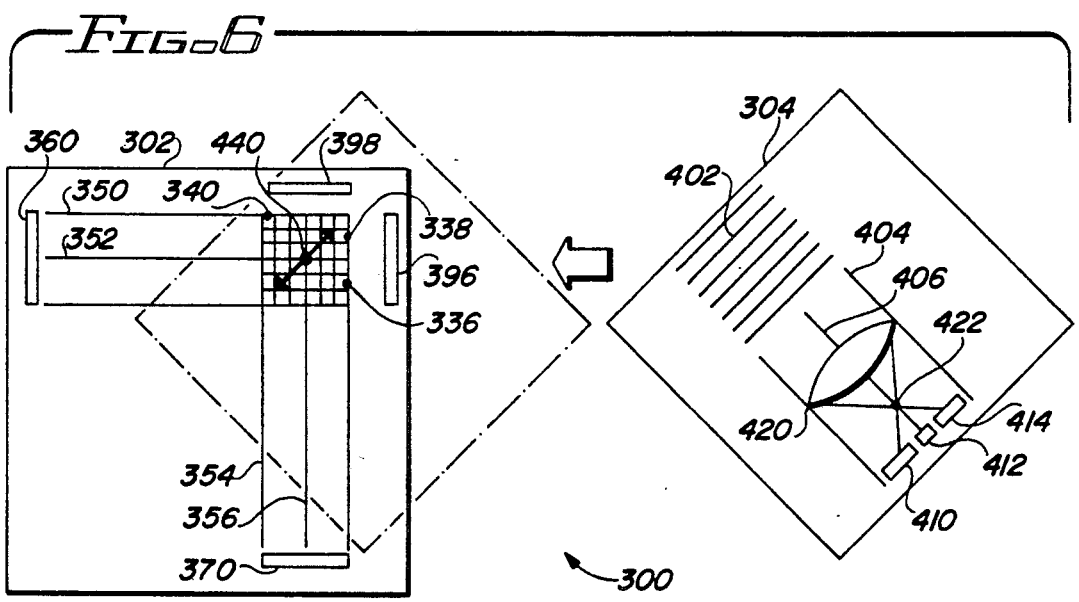
FIG. 6 is a schematic diagram of an alternative embodiment of the opto-electronic channel of the present invention.

FIG. 6 shows another embodiment of a optical channel of the present invention and is referred by the general reference number 300. Channel 300 is comprised of a substrate 302 and a substrate 304. Substrate 302 contains the polarization or data detection components as well as the power detection components. Substrate 304 contains the tracking and focusing components.

Substrate 302 has crossed grating coupler 336 comprising a pair of grating couplers 338, 340, a pair of waveguides 350 and 354 and a pair of axes 352, 356 similar to couplers 38, 40, waveguides 50, 54 and axes 52, 56, respectively, of channel 28. A single optical detector 360 is located within waveguide 350 and a single optical detector 370 is located within waveguide 354. A pair of detectors 396 and 398 are similar to detectors 96 and 98, respectively, of channel 28 are connected to a power detection circuit similar to circuit 108.

Substrate 304 has a TE type grating coupler 402. Coupler 402 couples light into a waveguide 404 along an axis 406. A plurality of optical detectors 410, 412 and 414 are located within waveguide 404 and are positioned in a direction perpendicular to axis 406. A lens 420 is located within waveguide 404 between the coupler 402 and the detectors 410, 412 and 414. Lens 420 focuses the coupled light to a focus point 422 in front of the detectors. From the focus point 422 the light diverges and strikes the detectors 410, 412 and 414. Substrate 304 is preferably positioned over substrate 302 as shown by the dotted line. Couplers 338, 340 and 402 all overlap. Channel 300 may be substituted for channel 28 and system 10 with substrate 304 located between substrate 302 and medium 20.

Coupler 402 is a TE coupler and the plane of polarization of the light from laser 12 is perpendicular to waveguide axis 406. Coupler 402 may be a TM coupler in which case the plane of polarization is parallel to waveguide axis 406. For proper track servo detection, the tracks 169 on medium 20 must make an angle with waveguide axis 406 of less than forty-five degrees (45°). In the preferred embodiment the angle is zero degrees (0°).

Figure 7:
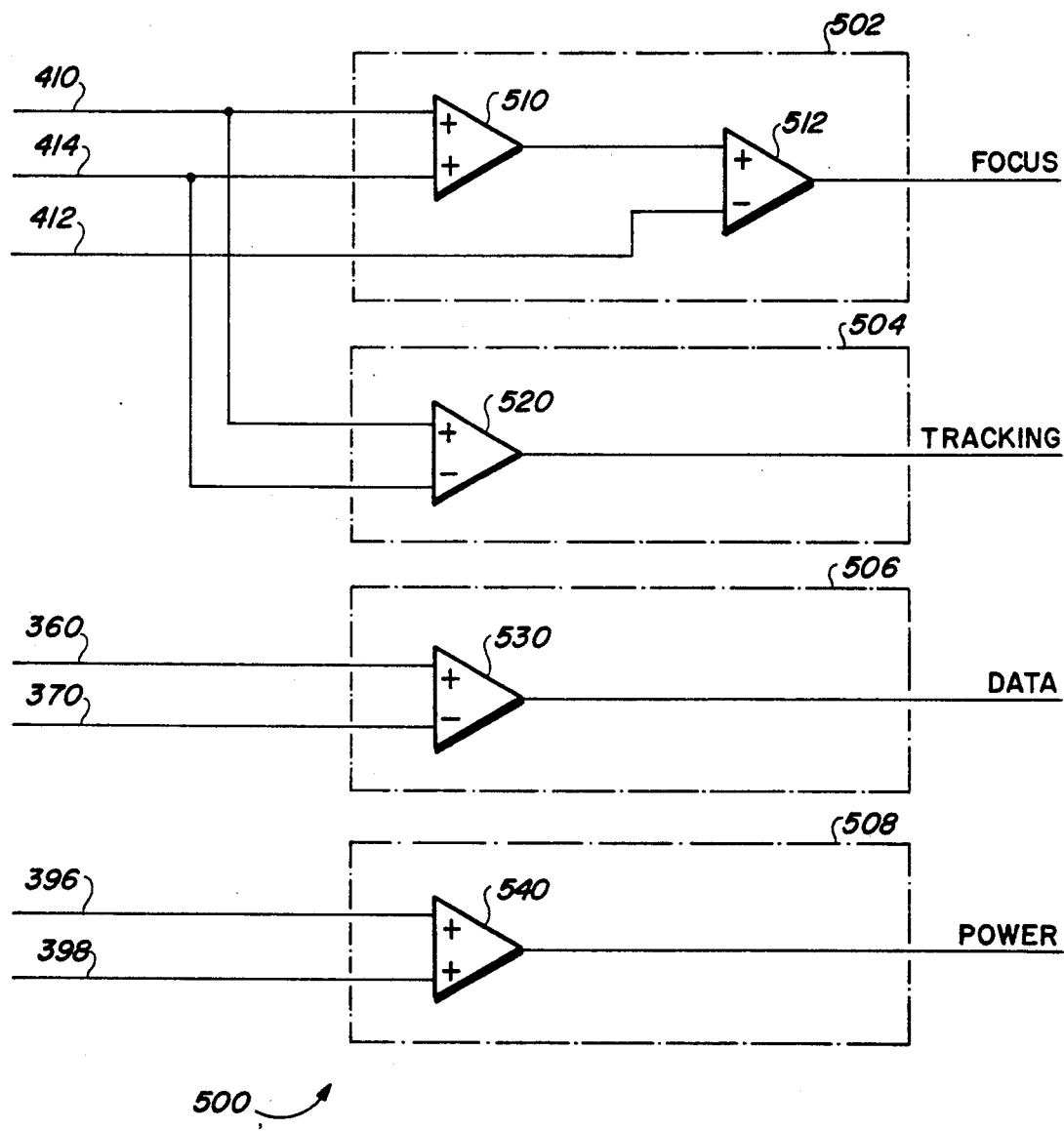
FIG. 7 is a diagram of a circuit for the system of FIG. 6.

FIG. 7 shows a diagram of a detector circuit and is designated by the general reference number 500. Circuit 500 is comprised a focus detector circuit 502, a tracking detector circuit 504, a data detector circuit 506 and a power detector circuit 508. Circuit 502 comprises a summing amplifier 510 and differential amplifier 512. Detectors 410 and 414 are connected to amplifier 510.

The output of amplifier 510 and detector 412 are connected to differential amplifier 512. The output of differential amplifier 512 is the focus error signal.

Circuit 504 has a differential amplifier 520. Differential amplifier 520 is connected to detectors 410 and 414. The output of amplifier 520 is the tracking error signal. Circuit 506 has a differential amplifier 530. Amplifier 530 is connected to detectors 360 and 370. The output of amplifier 530 is the data signal. Circuit 508 comprises a summing amplifier 540. Amplifier 540 is connected to detectors 396 and 398. The output of amplifier 540 is the power signal.

The operation of channel 300 may now be understood. Incoming light from the laser 12 has a plane of polarization 440. The reflected light has its plane of polarization rotated relative to plane 440. This rotation is detected as a difference in outputs of detectors 360 and 370 by circuit 506 and the output is the data signal.

The reflected light will also be coupled into waveguide 404 by coupler 402. If the head is off track then the intensity of the light at detectors 410 and 414 will be unequal. The difference is determined by circuit 504 and a track error signal is generated.

If the medium 20 is too close to objective lens 18, more light will strike detector 412 compared to the sum of light at detectors 410 and 414. If the medium is too far from the objective lens 18, more light will strike detectors 410 and 414. This difference is detected by circuit 502 and a focus error signal is generated.

Figure 8:
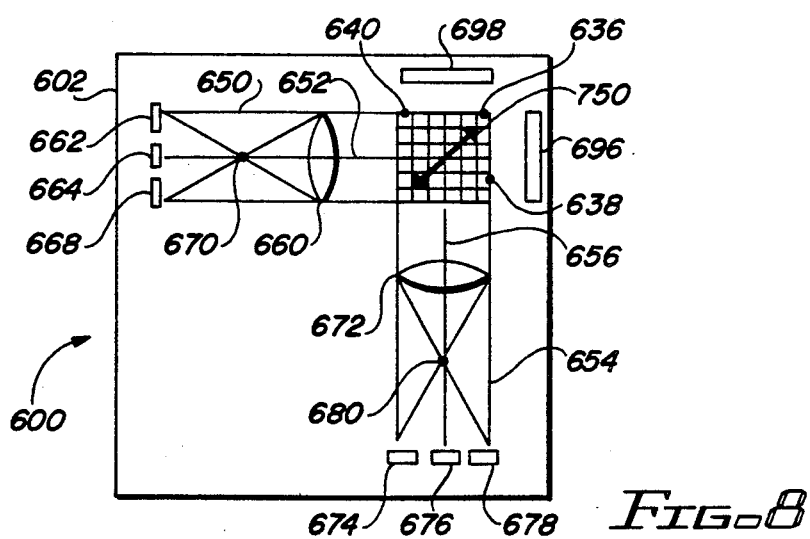
FIG. 8 is a schematic diagram of an alternative embodiment of the opto-electronic channel of the present invention.

FIG. 8 shows an alternative embodiment of the optical channel of the present invention and is designated by the general reference number 600. Channel 600 may be substituted for channel 28 in system 10. Channel 600 has a substrate 602. Substrate 602 has a crossed grating coupler 636 which is comprised of a pair of TE type grating couplers 638 and 640. Substrate 602 also has a pair of waveguides 650 and 654 and a pair of axis 652 and 656 similar to waveguides 50 and 54 and axis 52 and 56, respectively of channel 28. A lens 660 is located within waveguide 650. A plurality of detectors 662, 664 and 668 are located in waveguide 650 and are positioned in a line perpendicular to axis 652. Lens 660 has a focus point 670 which is located approximately half way between lens 660 and detectors 662, 664 and 668.

A lens 672 is located within waveguide 654. A plurality of detectors 674, 676 and 678 are located in waveguide 654 and are positioned in a line perpendicular to axis 656. Lens 672 has a focus point 680 which is located approximately half way between lens 672 and detectors 674, 676 and 678. A pair of detectors 696 and 698 are located along axis 652 and 656, respectively, and are similar to detectors 96 and 98, respectively, of channel 28.

Figure 9:
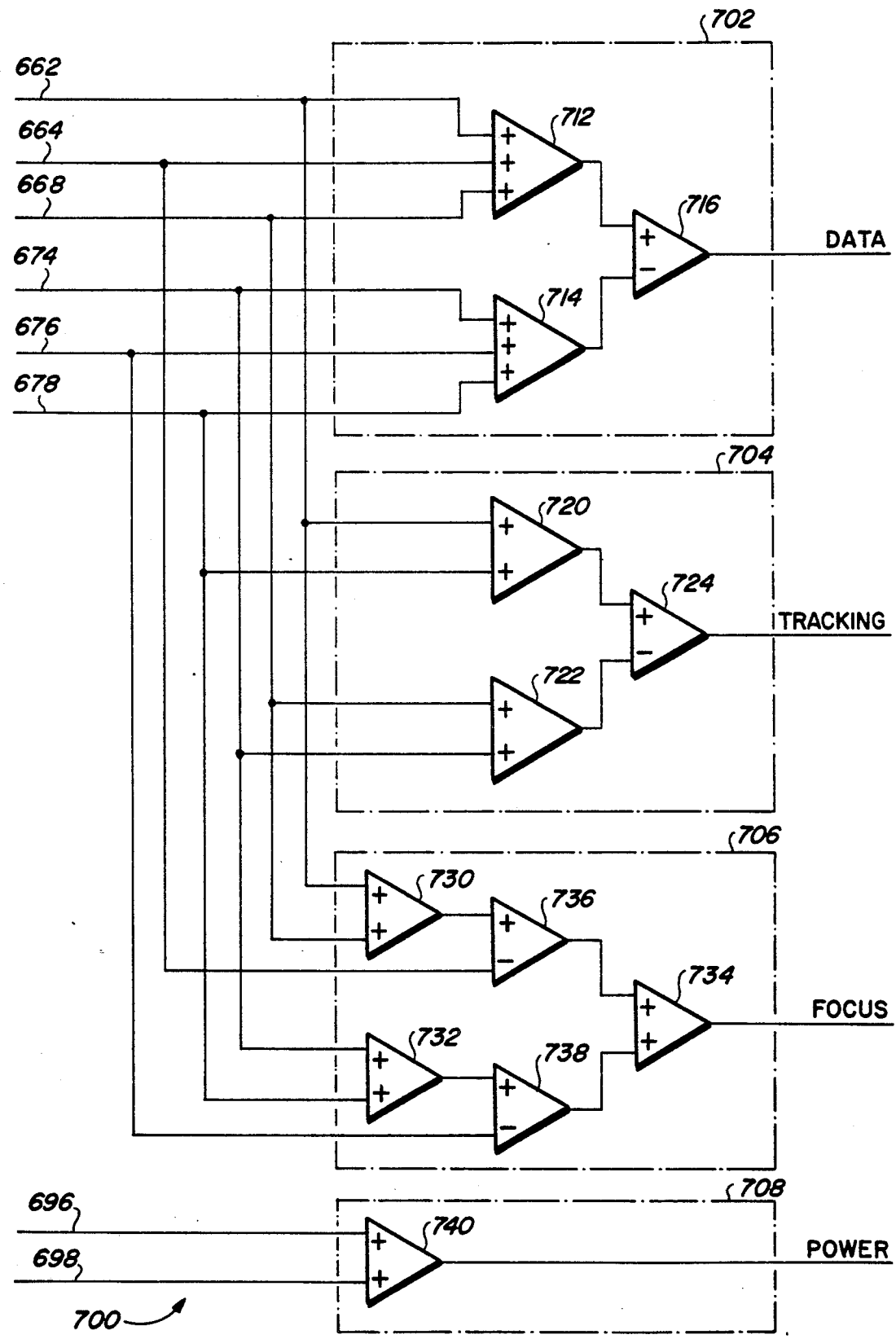
FIG. 9 is a diagram of a circuit for the system of FIG. 8.

FIG. 9 shows a detection circuit for use with channel 600 and is designated by the general reference number 700. Circuit 700 comprises a data detector circuit 702, a track detector circuit 704, and focus detector circuit 706 and a power detector circuit 708. Circuit 702 is comprised of a pair of summing amplifiers 712 and 714 and a differential amplifier 716. Summing amplifier 712 is connected to detectors 662, 664 and 668 and summing amplifier 714 is connected to detectors 674, 676 and 678. Differential amplifier 716 is connected to amplifiers 712 and 714. The output of amplifier 716 is the data signal.

Circuit 704 comprises a pair of summing amplifiers 720 and 722 and a differential amplifier 724. Summing amplifier 720 is connected to detectors 662 and 678 and summing amplifier 722 is connected to detectors 668 and 674. Differential amplifier 724 is connected to amplifiers 720 and 722. The output of amplifier 724 is the tracking error signal.

Circuit 706 comprises a plurality of summing amplifiers 730, 732 and 734 and a pair of differential amplifiers 736 and 738. Amplifier 730 is connected to detectors 662 and 668, and amplifier 732 is connected to detectors 674 and 678. Amplifier 736 is connected amplifier 730 and detector 664. Amplifier 738 is connected to amplifier 732 and detector 676. Amplifier 734 is connected to amplifiers 736 and 738 and its output is the focus error signal. Circuit 708 has a summing amplifier 740 connected to detectors 696 and 698. The output of the amplifier 740 is the power signal.

The operation of channel 600 is similar to channel 28 and system 10. Light from laser 12 passes through crossed grating 636 with a plane of polarization 750. A portion of the incoming light is coupled to detectors 696 and 698, and circuit 708 generates a power signal for laser control 14. Light returning from medium 20 is coupled into waveguides 650 and 654. Any difference in rotational direction of the plane of polarization relative to plane 750 is detected by the circuit 702 and a data signal is produced. If medium 20 is out of focus, then the light hitting middle detectors 664 and 676 will be greater or less than the light hitting outer detectors 662, 668, 674 and 678. This difference is detected by circuit 706 and a focus error signal is sent to focus control 24. If optical head 30 off track, then the light hitting outer detectors 662 and 678 will be greater or less than the light hitting inner detectors 668 and 674. This difference will be detected by circuit 704 and a tracking error signal is sent to track control 172.

There are a number of ways to manufacture the present invention, however the preferred method is by photolithography and ion milling. The substrate may be made of glass or other transparent material. The grating coupler pattern is placed on the substrate by photolithography. The crossed grating is made by forming two TE grating patterns at approximately right angles to one another. The pattern is then etched into the surface of the substrate by ion milling. The crossed grating is preferably etched and ion milled into the substrate but it may also be formed on top of the waveguide. The fabrication of optical grating couplers is described in detail in the book by H. Nishihara, M. Haruna, and T. Suhara, *Optical Integrated Circuits*, McGraw Hill, New York, 1989.

After the coupler is formed, the waveguide is deposited on the substrate. A film of glass is deposited on the substrate to a depth of sufficient thickness for a single mode planar waveguide. A typical depth may be two microns. Waveguide formation is described in the Nishihara book, as well as in the articles by S. Dutta et al., "Extremely Low-Loss Glass Thin-Film Optical Waveguides", *Journal of Applied Physics*, Vol. 52, pp. 3873 (1981) and M. Gupta, "Laser Annealing Of Corning 7059 Glass Waveguides," *Applied Optics*, Vol. 29, pp. 2307 (1990).

The beamsplitters and lenses are formed next on the waveguide surface by the combination of photolithography and ion beam etching. Alternatively, the beamsplitters and lenses may be formed within or on the substrate. The manufacture of these devices is also described in the Nishihara book.

Finally, the optical detectors are formed. An amorphous silicon layer (such as a hydrogenated amorphous silicon (a-Si:H) is deposited to provide an active layer.

The detector area is defined on the waveguide surface by a combination of photolithography and plasma etching. The detector structure is completed by formation of Cr and Au interdigitated fingers (Shottky barrier metal contacts) using photolithography, liftoff and metal thin-film deposition techniques. After the electrical signal lead routing is done for the detectors, they are optionally encapsulated by a dielectric thin-film layer.

The formation of the optical detectors is described in R.G. Hunsperger, *Integrated Optics: Theory and Technology*, Springer-Verlag, Berlin, 1984, pp 251-252; D.L. Rogers, "Interdigitated Metal Semiconductor Metal Detectors", OSA Proceedings On Picosecond Electronics and Optoelectronics,(1989).

Although the orthogonal couplers, waveguides and related components are preferably formed on the same surface of the substrate, they may also be formed with each one of the orthogonal waveguides located on a separate side of the substrate.

The advantages of the present invention may now be understood. The entire opto-electronic channel may be formed on a single substrate by photolithography. This greatly simplifies the manufacturing process and ensures that the components will be properly aligned.

The use of a crossed or overlapping grating couplers provides another advantage. Systems of the prior art used a TE and a TM coupler located side by side in order to couple the two orthogonal components of the reflected beam. In effect one side of the beam was sampled for the first polarization component and the other side of the beam was sampled for the second polarization component. Half of the beam was transmitted through the coupler and not even detected. This problem is critical because the reflected light beam is not perfectly symmetrical but tends to shift from one side to the other. In contrast the overlapping couplers of the present invention sample each polarization component across the entire beam diameter. This gives the system a much greater sensitivity and ensures more reliable data detection.

The present invention is also insensitive to the wavelength changes common to systems which use semiconductor laser diodes as sources. Prior art systems use a TE and TM coupler together to couple the separate polarization components. However, the efficiency of these two couplers is different at different light frequencies. Minor variations in the laser frequency add errors to the data signals. The present invention solves this problem by using two of the same type of coupler (TE or TM) oriented perpendicular to each other. As the frequency of the light changes, the efficiency of both couplers changes by the same amount and the data signal is reduced, but the differential detection system is not imbalanced. This provides the present invention with larger common mode noise rejection than previous art.

The invention has other uses. For example, the invention could be used in any application where it is necessary to determine the orientation of a plane of polarized light.

While the invention has been particularly shown and described with references to particular embodiments thereof, it will be understood by those skilled in the art that various other changes in form and details may be made therein without departing from the spirit and scope of the invention.

What is claimed is:

1. A polarization detection system comprising:
   a first waveguide channel;
   a first grating coupler for receiving a polarized light beam and coupling a first polarized component light beam into the first waveguide channel along a first axis;
   a first optical detector in optical communication with the first waveguide channel for detecting the first polarized component light beam;
   a second waveguide channel;
   a second grating coupler for receiving said polarized light beam and coupling a second polarized component light beam into the second waveguide channel along a second axis, the first and second polarized components being substantially orthogonal components, and the first and second axes being substantially perpendicular, the second grating coupler being of a type similar to the first grating coupler and oriented substantially perpendicular to and overlapping the first grating coupler; and
   a second optical detector in optical communication with the second waveguide channel for detecting the second polarized component light beam.

2. The system of claim 1, further including:
   a detection circuit connected to the first and second optical detectors for producing a detection signal responsive to the difference in intensity of the first and second polarized component light beams.

3. The system of claim 1, wherein the first and second grating couplers are both of a transverse electric (TE) type of coupler.

4. The system of claim 1, wherein the first and second grating couplers are both of a transverse magnetic (TM) type of coupler.

5. The system of claim 1, wherein the first and second couplers are comprised of a crossed grating coupler.

6. A data storage system comprising:
   a light generation means for providing a polarized light beam;
   a data storage medium for receiving said polarized light beam and providing a reflected light beam;
   a first waveguide channel;
   a first grating coupler in optical communication with the data storage medium for receiving the reflected light beam and coupling a first polarized component light beam into the first waveguide channel along a first axis;
   a first optical detector in optical communication with the first waveguide channel for detecting the first polarized component light beam;
   a second waveguide channel;
   a second grating coupler in optical communication with the data storage medium for receiving said reflected light beam and coupling a second polarized component light beam into the second waveguide channel along a second axis, the first and second polarized components being substantially orthogonal components and the first and second axes being substantially perpendicular, the second grating coupler being of a type similar to the first grating coupler and oriented substantially perpendicular to and overlapping the first grating coupler; and
   a second optical detector in optical communication with the second waveguide channel for detecting the second polarized component light beam.

7. The system of claim 6, further including:
   a detection circuit connected to the first and second optical detectors for producing a detection signal responsive to the difference in intensity of the first and second polarized components.

8. The system of claim 6, further including:
a third optical detector in optical communication with the light generation means via the first grating coupler for generating a first signal;
a fourth optical detector in optical communication with the light generation means via the second grating coupler for generating a second signal; and
a power control circuit connected to the light generation means and the third and fourth optical detectors for generating a power signal responsive to the first and second signals.

9. The system of claim 6, wherein the first and second grating couplers are both of a transverse electric (TE) type of coupler.

10. The system of claim 6, wherein the first and second grating couplers are both of a transverse magnetic (TM) type of coupler.

11. The system of claim 6, further including:
a first beamsplitter located in the first waveguide channel;
a first focus optical detector in optical communication with the first beamsplitter;
a second beamsplitter located in the second waveguide channel; and
a second focus optical detector in optical communication with the second beamsplitter.

12. The system of claim 11 further including:
a focus detection circuit connected to the first and second focus optical detectors for comparing the intensity of light at the first and second optical detector and generating a focus signal responsive thereto.

13. The system of claim 12 further including:
a lens located between the data storage medium and the first and second grating couplers for focussing the light beam onto the medium; and
a lens movement means connected to the lens for moving the lens relative to the medium responsive to said focus error signal.

14. The system of claim 6, wherein the first and second optical detectors each have a first and second section and further including a track detection circuit connected to the first and second sections of the first and second optical detectors for generating a track error signal.

15. The system of claim 14, wherein the light generation means, first and second waveguide channels, first and second grating couplers, and first and second optical detectors comprise an optical head; and
further including an optical head movement means connected to the optical head for moving the optical head relative to the medium responsive to said track error signal.

16. The system of claim 6, wherein the first and second optical detectors each have a first, second and third sections and further including a first and a second lens located in said first and second waveguides, respectively, and a track detector circuit connected to the first and third sections for generating a track error signal and a focus detection circuit connected to the first, second and third sections for generating a focus error signal.

17. The system of claim 16, further including:
a lens located between the data storage medium and the first and second grating couplers for focussing the light beam onto the medium; and
a lens movement means connected tot he lens for moving the lens relative to the medium responsive to said focus error signal.

18. The system of claim 16, wherein the light generation means, first and second waveguide channels, first and second grating couplers, and first and second optical detectors comprise an optical head; and
further including an optical head movement means connected to the optical head for moving the optical head relative to the medium responsive to said track error signal.

19. The system of claim 16 further including:
a third waveguide channel located in a plane different from the first and second waveguides and having a lens;
a third grating coupler for receiving said reflected light beam and coupling said reflected light beam into the third waveguide channel along a third axis, said third axis being offset at an angle of substantially 45° from both the first and the second axis;
a third optical detector in optical communication with the third waveguide channel having a first, second and third sections for detecting the reflected light beam;
a track detection circuit connected to the first and third sections of the third optical detector for generating a track error signal; and
a focus detection circuit connected to the first, second and third sections of the third optical detector for generating a focus error signal.

20. The system of claim 19 further including:
a lens located between the data storage medium and the first and second grating couplers for focussing the light beam onto the medium; and
a lens movement means connected to the lens for moving the lens relative to the medium responsive to said focus error signal.

21. The system of claim 19 wherein, the light generation means, first, second and third waveguide channels, first second and third grating couplers, and first, second and third optical detectors comprise an optical head; and
further including an optical head movement means connected to the optical head for moving the optical head relative to the medium responsive to said track error signal.

22. A polarization detection system comprising:
a substrate;
a first waveguide channel formed on the substrate and having a direction of propagation along a first axis;
a second waveguide channel formed on the substrate and having a direction of propagation along a second axis, the second axis being substantially perpendicular to the first axis;
a crossed grating coupler comprised of overlapping grating couplers of a similar type formed on the substrate at the intersection of the first and second axes for receiving a polarized light beam and for coupling a first polarized component light beam into the first waveguide and for coupling a second polarized component light beam into the second waveguide;
a first optical detector formed on the substrate in optical communication with the first waveguide channel for detecting said first polarized component light beam; and a second optical detector formed on the substrate in optical communication with the second waveguide channel for detecting said second polarized component light beam.

23. A polarization detection system comprising:
a substrate;
a first waveguide channel formed on a first side of the substrate and having a direction of propagation along a first axis;
a first grating coupler formed on said first side of the substrate for receiving a polarized light beam and coupling a first polarized component light beam into the first waveguide channel along said first axis;
a first optical detector formed on said first side of the substrate in optical communication with the first waveguide channel for detecting the first polarized component light beam;
a second waveguide channel formed on a second side of the substrate and having a direction of propagation along a second axis, the second axis being substantially perpendicular to the first axis;
a second grating coupler formed on said second side of the substrate for receiving said polarized light beam and coupling a second polarized component light beam into the second waveguide channel along said second axis, the first and second polarized components being substantially orthogonal components and the first and second axes being substantially perpendicular, the second grating coupler being of a type similar to the first grating coupler and oriented substantially perpendicular to and overlapping the first grating coupler; and
a second optical detector formed on said second side of the substrate in optical communication with the second waveguide channel for detecting the second polarization component light beam.

24. A polarization detection system comprising:
a first substrate;
a first waveguide channel formed on the first substrate and having a direction of propagation along a first axis;
a first grating coupler formed on the first substrate for receiving a polarized light beam and coupling a first polarized component light beam into the first waveguide channel along said first axis;
a first optical detector formed on the first substrate in optical communication with the first waveguide channel for detecting the first polarized component light beam;
a second substrate;
a second waveguide channel formed on the second substrate and having a direction of propagation along a second axis, the second axis being substantially perpendicular to the first axis;
a second grating coupler formed on the second substrate for receiving said polarized light beam and coupling a second polarized component light beam into the second waveguide channel along said second axis, the first and second polarized components being substantially orthogonal components and the first and second axes being substantially perpendicular, the second grating coupler being of a type similar to the first grating coupler and oriented substantially perpendicular to and overlapping the first grating coupler; and
a second optical detector formed on the second substrate in optical communication with the second waveguide channel for detecting the second polarization component light beam.

* * * * *